United States Patent
Lee et al.

(10) Patent No.: US 9,891,374 B2
(45) Date of Patent: Feb. 13, 2018

(54) DISPLAY DEVICE HAVING A SUPPORT MEMBER

(71) Applicant: SAMSUNG DISPLAY CO., LTD., Yongin, Gyeonggi-do (KR)

(72) Inventors: Yongjun Lee, Gyeonggi-do (KR); Jungki Kim, Chungcheongnam-do (KR); SeongKoo Jeong, Chungcheongnam-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 254 days.

(21) Appl. No.: 14/685,833

(22) Filed: Apr. 14, 2015

(65) Prior Publication Data

US 2015/0338572 A1 Nov. 26, 2015

(30) Foreign Application Priority Data

May 20, 2014 (KR) ........................ 10-2014-0060435

(51) Int. Cl.
| | |
|---|---|
| *G02B 6/24* | (2006.01) |
| *F21V 8/00* | (2006.01) |
| *G02F 1/1335* | (2006.01) |
| *G02F 1/1333* | (2006.01) |

(52) U.S. Cl.
CPC ......... *G02B 6/0088* (2013.01); *G02B 6/0093* (2013.01); *G02F 1/1336* (2013.01); *G02F 2001/133317* (2013.01); *G02F 2001/133322* (2013.01)

(58) Field of Classification Search
CPC ......... G02F 1/133608; G02F 1/133615; G02F 2001/133314; G02F 2201/503
USPC ................................. 362/611–613, 632–634
See application file for complete search history.

(56) References Cited

U.S. PATENT DOCUMENTS

| | | |
|---|---|---|
| 7,599,019 B2 | 10/2009 | Chang |
| 8,582,050 B2 | 11/2013 | Li et al. |
| 8,608,346 B2 | 12/2013 | Wang et al. |
| 8,696,189 B2 | 4/2014 | Yu |
| 2001/0050732 A1* | 12/2001 | Okamoto .......... G02F 1/133308 349/58 |
| 2010/0271806 A1* | 10/2010 | Bae .................. G02B 6/008 362/97.1 |
| 2013/0258236 A1 | 10/2013 | Zhang et al. |
| 2013/0258704 A1 | 10/2013 | Chen et al. |
| 2014/0112021 A1* | 4/2014 | Wang .............. G02B 6/0088 362/633 |

(Continued)

FOREIGN PATENT DOCUMENTS

| | | |
|---|---|---|
| JP | 2012146504 | 8/2012 |
| JP | 2012216528 | 11/2012 |

(Continued)

*Primary Examiner* — Andrew Coughlin
*Assistant Examiner* — Keith Delahoussaye
(74) *Attorney, Agent, or Firm* — F. Chau & Associates, LLC

(57) ABSTRACT

A display device includes a display device including a display panel and a light source configured to emit light. A light guide member is configured to receive the light and guides the light toward the display panel. A protective member is dimensioned and configured to receive the light guide member. The protective member includes a sidewall portion. A support member is configured to absorb pressure from the light guide member.

19 Claims, 15 Drawing Sheets

(56) References Cited

U.S. PATENT DOCUMENTS

2014/0176869 A1* 6/2014 Lee .................. G02F 1/133615
                                                        349/65
2015/0177449 A1* 6/2015 Uchida ............. G02F 1/133308
                                                       362/611

FOREIGN PATENT DOCUMENTS

| JP | 2013130829 | 7/2013 |
|----|------------|--------|
| KR | 1020090028686 | 6/2011 |
| KR | 1020110070583 | 6/2011 |

\* cited by examiner

DISPLAY DEVICE HAVING A SUPPORT MEMBER

CROSS-REFERENCE TO RELATED APPLICATION

This U.S. non-provisional patent application claims priority under 35 U.S.C. § 119 to Korean Patent Application No. 10-2014-0060435, filed on May 20, 2014, the disclosure of which is incorporated by reference herein in its entirety.

TECHNICAL FIELD

Exemplary embodiments of the present inventive concept relate to a display device. More particularly, exemplary embodiments of the present inventive concept relate to a display device having a support member.

DISCUSSION OF RELATED ART

Examples of a display device include a transmissive type display device, a transflective type display device, and a reflective type display device. The transmissive and transflective type display devices include a display panel to display an image and a backlight unit to supply light to the display panel.

The backlight unit may include a light source to emit light and a light guide member to guide the light emitted from the light source to the display panel. The light source may include a circuit board and light emitting blocks disposed on the circuit board. The light emitting blocks may be arranged to face the light guide member.

SUMMARY

Exemplary embodiments of the present inventive concept provide a display device capable of stably assembling a light guide member with other elements thereof.

Exemplary embodiments of the present inventive concept provide a display device including a display panel and a light source configured to emit light. A light guide member is configured to receive the light and guides the light toward the display panel. A protective member is dimensioned and configured to receive the light guide member. The protective member includes a sidewall portion. A support member is configured to absorb pressure from the light guide member.

The support member includes a coupling part coupled to the sidewall portion. A decompressing part includes at least one bent portion spaced apart from the sidewall portion and connected to the coupling part.

The bent portion may include at least one curved surface.

The coupling part may be disposed on an inner surface or an outer surface of the sidewall portion.

The decompressing part may include a first portion coupled to the coupling part and bent from the coupling part in a first predetermined direction. A second portion of the decompressing part may be connected to the first portion and may be bent from the first portion in a second predetermined direction.

The second portion may be in contact with a side surface of the light guide member.

The first portion may be substantially parallel to the bottom portion and the second portion may be substantially parallel to the sidewall portion.

The second portion may include an inclined portion connected to the first portion and bent from the first portion at a first angle. The second portion may include a support portion in contact with the light guide member and bent from the inclined portion at a second angle to be substantially parallel to the sidewall portion.

The decompressing part may include a third portion bent from the second portion toward the coupling portion and including at least one curved surface.

The coupling part may include a first coupling portion disposed on an outer surface of the sidewall portion. A second coupling portion may be bent from the first coupling portion in a predetermined direction and may be substantially parallel to the bottom portion. A third coupling portion may be bent from the second coupling portion. The third coupling portion may be substantially parallel to the first coupling portion, and disposed on an inner surface of the sidewall portion. The sidewall portion may be partially disposed in a space defined by the first, second, and third coupling portions.

The display device may include a coupling member coupling the support member and the protective member.

The coupling member may include an adhesive.

The sidewall portion may include a first through-hole formed therethrough. The coupling part may include a second through-hole overlapping the first through-hole. The coupling member may be disposed in the first and second through-holes and may couple the support member and the protective member.

The display device may include a plurality of support members. The support members may respectively support side surfaces of the light guide member.

The display device may include a plurality of decompressing parts and a plurality of coupling parts. The coupling parts may be respectively coupled to two sidewall portions adjacent to each other. The decompressing parts may be respectively coupled to the coupling parts.

The decompressing parts may respectively be in contact with side surfaces of the light guide member. The side surfaces may respectively face the sidewall portions coupled to the coupling parts.

The support member may include a connection portion connecting the coupling parts. The support member may cover the adjacent sidewall portions.

The coupling part may include a first coupling portion disposed on an outer surface of a sidewall portion coupled thereto. A second coupling portion may be bent from the first coupling portion in a predetermined direction and may be substantially parallel to the bottom portion. A third coupling portion may be bent from the second coupling portion and may be substantially parallel to the first coupling portion, and disposed on an inner surface of the sidewall portion. The coupled sidewall portion may be partially disposed in a space defined by the first, second, and third coupling portions.

The support member may include a stainless steel.

Although the light guide member may have a relatively large size greater, the light guide member may be fixed in a predetermined position by the support member. Even though the light guide member may be thermally expanded, the light guide member may be stably accommodated in the protective member without being deformed.

BRIEF DESCRIPTION OF THE DRAWINGS

The above and other features of the present inventive concept will become more apparent by describing in detail exemplary embodiments thereof, with reference to the accompanying drawings in which.

DETAILED DESCRIPTION

It will be understood that when an element or layer is referred to as being "on", "connected to" or "coupled to" another element or layer, it may be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers may refer to like elements throughout the specification and drawings. Hereinafter, exemplary embodiments of the present inventive concept will be described in more detail with reference to the accompanying drawings.

Figure 1:
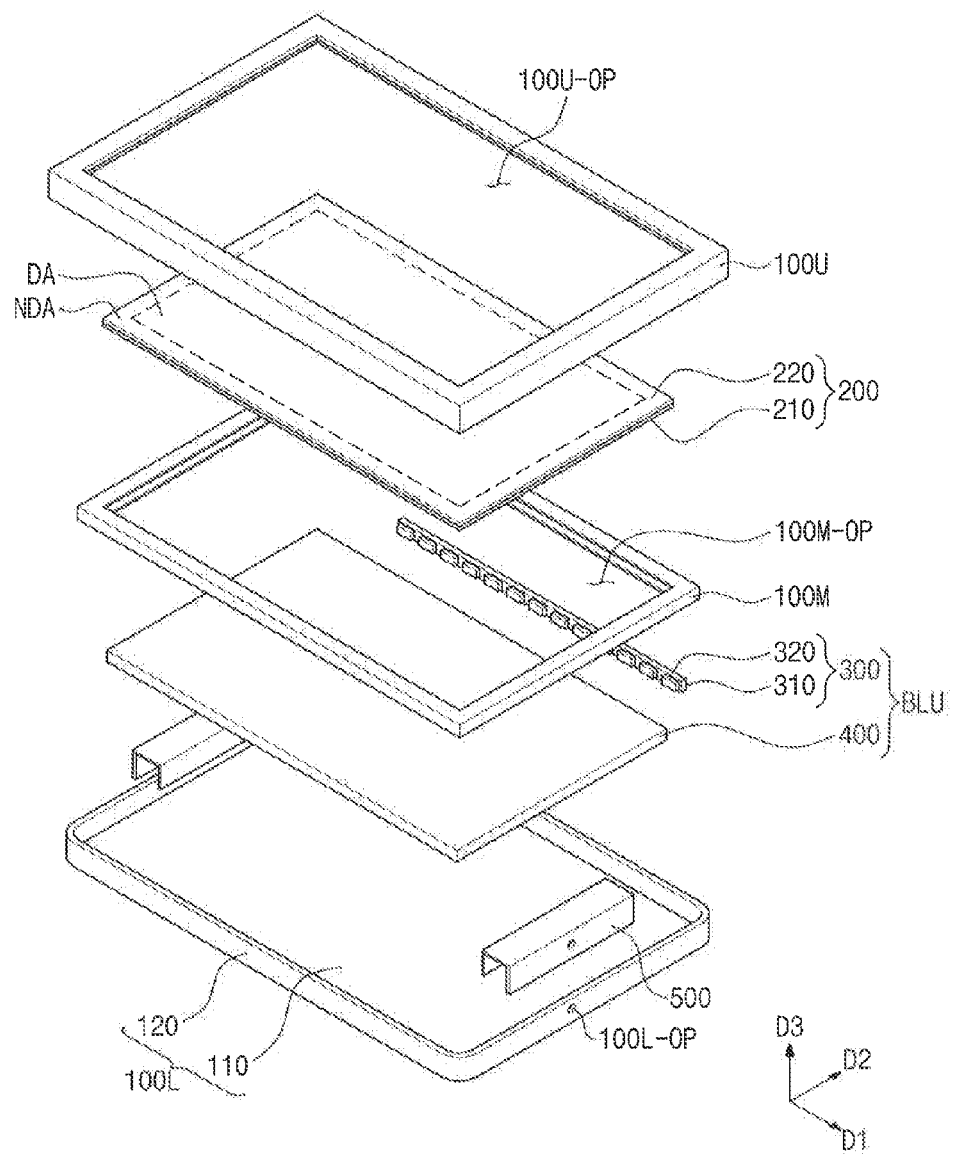
FIG. 1 is an exploded perspective view showing a display device according to an exemplary embodiment of the present inventive concept.
Figure 2:
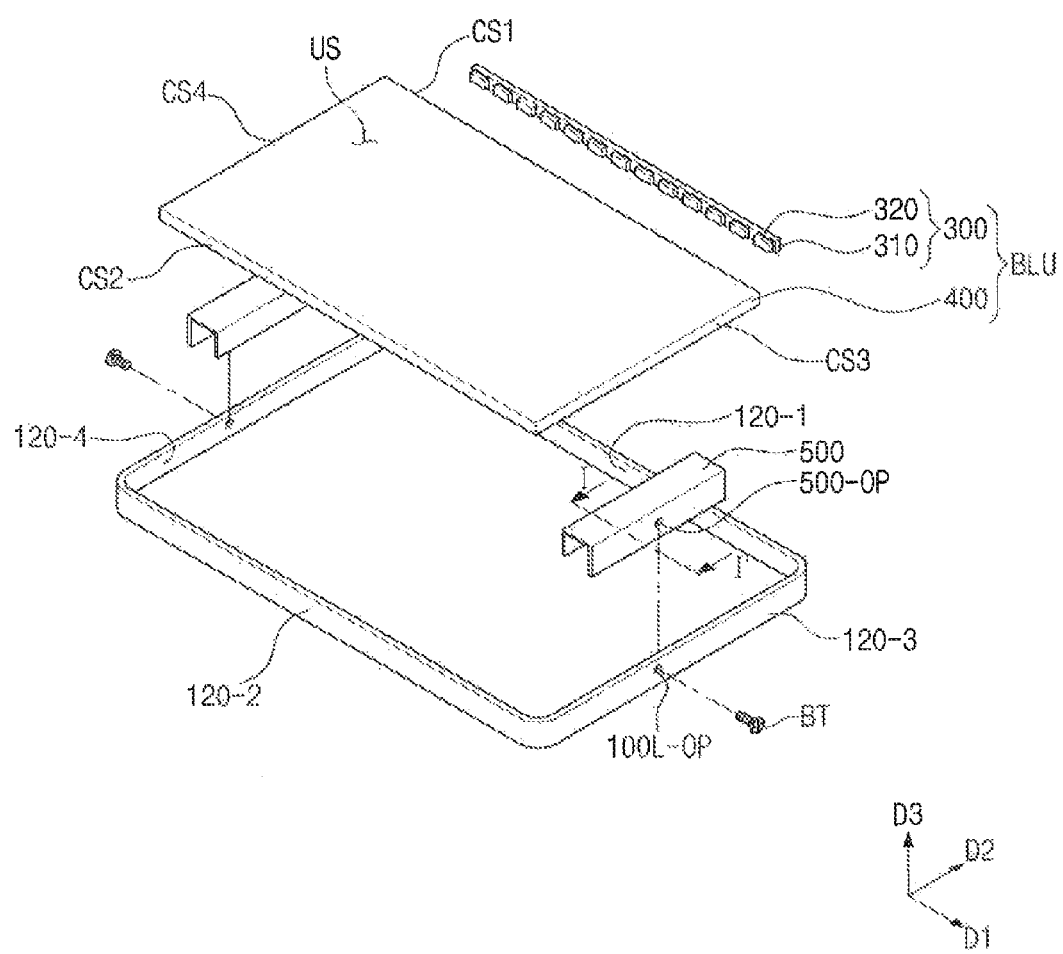
FIG. 2 is an exploded perspective view showing some elements of the display device shown in FIG. 1.
Figure 3A:
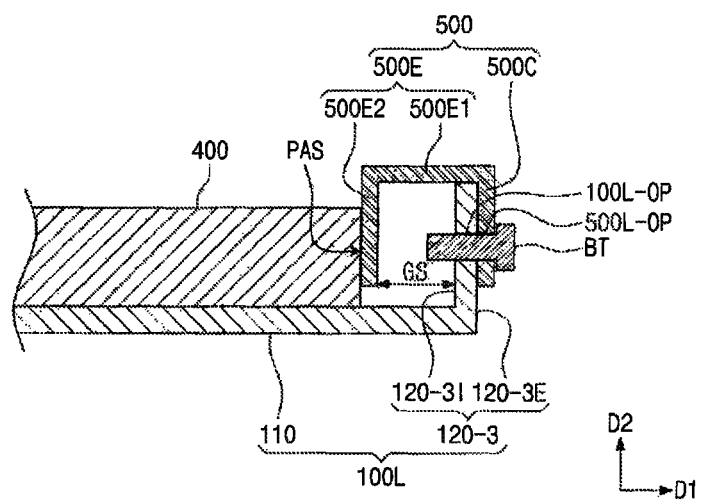
FIGS. 3A and 3B are cross-sectional views showing a coupled state of the elements shown in FIG. 2.
Figure 3B:
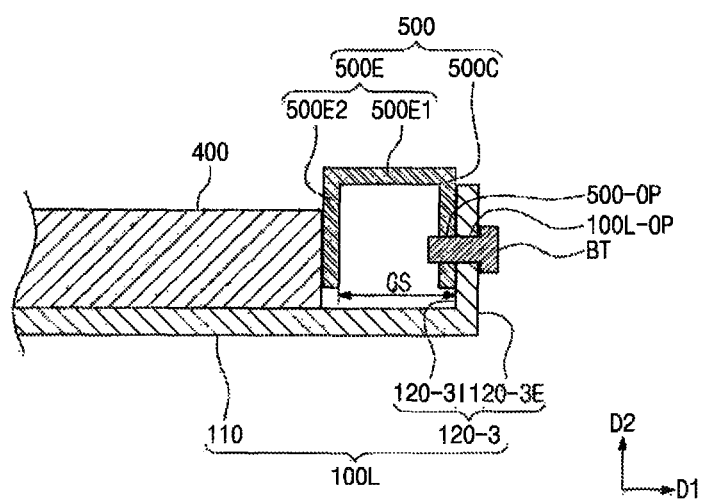

FIG. 1 is an exploded perspective view showing a display device according to an exemplary embodiment of the present inventive concept, FIG. 2 is an exploded perspective view showing some elements of the display device shown in FIG. 1, and FIGS. 3A and 3B are cross-sectional views showing a coupled state of the elements shown in FIG. 2.

The display device may have a rectangular shape. Hereinafter, a long-side direction of the display device may be referred to as a first direction D1 and a short-side direction of the display device may be referred to as a second direction D2. The second direction D2 may be substantially perpendicular to the first direction D1.

Referring to FIG. 1, the display device may include protective members 100U, 100M, and 100L, a display panel 200, a backlight unit BLU, and a support member 500. The backlight unit BLU includes a light source 300 and a light guide member 400.

The protective members 100U, 100M, and 100L may include a lower protective member 100L, an intermediate protective member 100M, and an upper protective member 100U, which may be sequentially stacked in a third direction D3 substantially vertical with respect to the first and second directions D1 and D2.

The upper protective member 100U and the lower protective member 100L may form an outer surface of the display device and other elements may be disposed therein. The lower protective member 100L may be, but is not limited to, an accommodation member. The upper protective member 100U may be disposed on the display panel 200 and the intermediate protective member 100M may be disposed under the display panel 200.

The upper protective member 100U may include an opening portion 100U-OP formed therethrough exposing a display area DA of the display panel 200, in which an image may be displayed. The upper protective member 100U may cover a non-display area NDA of the display panel 200. The non-display area NDA may be disposed adjacent to the display area DA and might not display the image.

The lower protective member 100L may be disposed under the display panel 200. The lower protective member 100L may include a bottom portion 110 and a sidewall portion 120 bent from the bottom portion 110 and extending in the third direction D3.

According to an exemplary embodiment of the present inventive concept, the bottom portion 110 may have a square shape. The sidewall portion 120 may be bent from four sides of the bottom portion 110. The sidewall portion 120 may include four sidewall portions 120-1, 120-2, 120-3, and 120-4 respectively corresponding to four sides of the bottom portion 110.

The sidewall portions 120-1 to 120-4 may include first and second sidewall portions 120-1 and 120-2 extending in the first direction D1 and facing each other in the second direction D2 and third and fourth sidewall portions 120-3 and 120-4 extending in the second direction D2 and facing each other in the first direction D1.

The sidewall portion 120 may include a first coupling hole 100L-OP formed through one of the first to fourth sidewall portions 120-1 to 120-4.

According to an exemplary embodiment of the present inventive concept, the first coupling hole 100L-OP may be formed through each of the third and fourth sidewall portions 120-3 and 120-4, which may define short sides of the display device and may face each other, but the first coupling hole 100L-OP is not limited thereto or thereby. A position of the first coupling hole 100L-OP may be changed as long as the first coupling hole 100L-OP corresponds to a second coupling hole 400-OP described below.

The intermediate protective member 100M may be disposed between the upper protective member 100U and the lower protective member 100L. The intermediate protective member 100M may include an opening portion 100M-OP.

The intermediate protective member 100M may have a rectangular frame shape overlapping the non-display area NDA of the display panel 200. The intermediate protective member 100M may support the display panel 200.

The display panel 200 may receive light from the backlight unit BLU and may display the image. The display panel 200 may be a transmissive or transflective type display panel. For instance, the display panel 200 may be, but is not limited to, a liquid crystal display panel or an electrophoretic display panel. According to an exemplary embodiment of the present inventive concept, the display panel may include a first substrate 210 and a second substrate 220.

The light source 300 may emit light. The light source 300 may include a circuit board 310 and a plurality of light emitting blocks 320 disposed on the circuit board 310. The circuit board 310 may include insulating layers and line layers, which are not shown in figures.

The light emitting blocks 320 may include at least one light emitting device. For instance, the light emitting device may be, but is not limited to, a light emitting diode. The light source 300 may include active devices disposed on the circuit board 310 to control the light emitting blocks 320.

The light emitting blocks 320 may be connected to the line layers of the circuit board 310 and may receive electrical signals from the circuit board 310. The electrical signals may include a source voltage and a dimming signal.

The light guide member 400 may guide the light emitted from the light source 300 to the display panel 200. The light guide member 400 may include a first surface US facing the display panel 200 in the third direction D3, a second surface (not shown) facing the first surface US in the third direction D3, and a plurality of side surfaces CS1 to CS4 connecting the first surface US and the second surface. The light guide member 400 may have a rectangular plate shape.

The side surfaces CS1 to CS4 may include first and second side surfaces CS1 and CS2 extending in the first direction D1 and facing each other in the second direction D2 and third and fourth side surfaces CS3 and CS4 extending in the second direction D2 and facing each other in the first direction D1. The side surfaces CS1 to CS4 may face the sidewall portions 120-1 to 120-4 of the lower protective member 100L, respectively.

The light guide member 400 may include a light incident surface to which light emitted from the light source 300 may be transmitted. According to an exemplary embodiment of the present inventive concept, the light incident surface may be disposed in the first side surface CS1, which may face the light source 300.

Although not shown in the figures, the light guide member 400 may include at least one connection surface. The connection surface may be disposed between two adjacent side surfaces among the side surfaces CS1 to CS4 and may connect the two adjacent side surfaces to each other. The light incident surface may be adjacent to the connection surface.

The light guide member 400 may include an exit surface from which light passing therethrough exits. According to an exemplary embodiment of the present inventive concept, the exit surface may be disposed on the first surface US facing the display panel 200. The exit surface may overlap a front surface of the display panel 200, and thus substantially the entire surface of the display panel 200 may receive light therethrough.

The support member 500 may be coupled to the lower protective member 100L. The support member 500 may be coupled to at least one sidewall portion of the sidewall portions 120-1 to 120-4.

A plurality of support members 500 may be coupled to the lower protective member 100L. According to an exemplary embodiment of the present inventive concept, two support members 500 may be provided. The support members 500 may be respectively coupled to the third and fourth sidewall portions 120-3 and 120-4 facing each other.

The support members 500 may have the same shape and configuration as each other. Hereinafter, one support member 500 will be described in more detail, and details of the other support members 500 may be omitted.

The support member 500 may be disposed adjacent to at least one of the side surfaces CS1 to CS4 of the light guide member 400. The support member 500 may absorb a pressure from the light guide member 400.

The support member 500 may be elastic. According to an exemplary embodiment of the present inventive concept, the elasticity of the support member 500 may be generated by the shape of the support member 500. The shape of the support member 500 may vary according to the pressure applied by the light guide member 400 and the pressure applied by the light guide member 400 may decrease due to deformation in the shape of the support member 500.

The support member 500 may include a durable material. For instance, the support member 500 may include an elastic metal material, e.g., a stainless steel. The support member 500 need not be damaged by the pressure applied by the light guide member 400 or heat generated by the light source 300.

The support member 500 may include a coupling part 500C and a decompressing part 500E. The coupling part 500C may be coupled to the third sidewall portion 120-3. The coupling part 500C may include a second coupling hole 500-OP. The second coupling hole 500-OP may overlap with the first coupling hole 100L-OP of the lower protective member 100L.

The coupling part 500C may be disposed on an inner side surface 120-3I or an outer side surface 120-3E of the third side surface portion 120-3. For instance, as shown in FIG. 3A, the support member 500 may be coupled to the outer side surface 120-3E of the third sidewall portion 120-3. The coupling part 500C may cover the outer surface 120-3E of the third sidewall portion 120-3.

As shown in FIG. 3B, the support member 500 may be coupled to the inner side surface 120-3I of the third sidewall portion 120-3. The coupling part 500C may be disposed on the inner side surface 120-3I of the third sidewall portion 120-3 and may expose the outer surface 120-3E of the third sidewall portion 120-3.

Referring to FIGS. 1 to 3B, the display device may include at least one coupling member BT. The coupling member BT may be disposed in the first coupling hole 100L-OP and the second coupling hole 500-OP to couple the coupling part 500C of the support member 500 and the third sidewall portion 120-3 of the lower protective member 100L. Due to the coupling member BT, a coupling force between the support member 500 and the lower protective member 100L may be increased.

The coupling member BT may be, but is not limited to, a bolt. The bolt BT may be disposed in the first coupling hole 100L-OP and the second coupling hole 500-OP. The coupling member BT may be a screw.

According to an exemplary embodiment of the present inventive concept, the coupling member BT may be an adhesive member. The support member 500 may be coupled to the inner side surface 120-3I or the outer side surface 120-3E using the coupling member BT, e.g., the adhesive member. When the support member 500 is coupled to the inner side surface 120-3I or the outer side surface 120-3E using the adhesive member, the first and second coupling holes 100L-OP and 500-OP may be omitted.

The decompressing part 500E may include at least one bent portion. The bent portion may correspond to a portion of the decompressing part and may be spaced apart from the sidewall portion 120-3.

According to an exemplary embodiment of the present inventive concept, the decompressing part 500E may include a first portion 500E1 and a second portion 500E2, which may be connected to each other. The first portion 500E1 may be connected to the coupling part 500C and bent from the coupling part 500C in the first direction D1. The first portion 500E1 may be substantially parallel with the bottom portion 110.

The second portion 500E2 may be connected to the first portion 500E1. The second portion 500E2 may be bent from the first portion 500E1 in the third direction D3. The second portion 500E2 may be substantially parallel with the third sidewall portion 120-3.

According to an exemplary embodiment of the present inventive concept, the bent portion may correspond to the connection portion between the first and second portions 500E1 and 500E2. The bent portion may be defined by portions of each of the first and second portions 500E1 and 500E2. The bent portion may be spaced apart from the coupling part 500C.

The second portion 500E2 may include at least one pressure absorbing surface PAS. The pressure absorbing surface PAS may be defined in a surface of the decompressing part 500E, which makes contact with the third side surface CS3 of the light guide member 400. The pressure absorbing surface PAS may have different area and different position in accordance with the shape of the decompressing part 500E. The decompressing part 500E may receive the pressure from the light guide member 400 through the pressure absorbing surface PAS.

The pressure absorbing surface PAS may be spaced apart from the inner side surface 120-3I of the third sidewall portion 120-3. A distance GS between the pressure absorbing surface PAS and the third sidewall portion 120-3 may vary depending on the position of the coupling part 500C coupled to the third sidewall portion 120-3.

The distance GS between the pressure absorbing surface PAS and the third sidewall portion 120-3 may vary depending on the size of the light guide member 400, as described in more detail below.

Figure 4A:
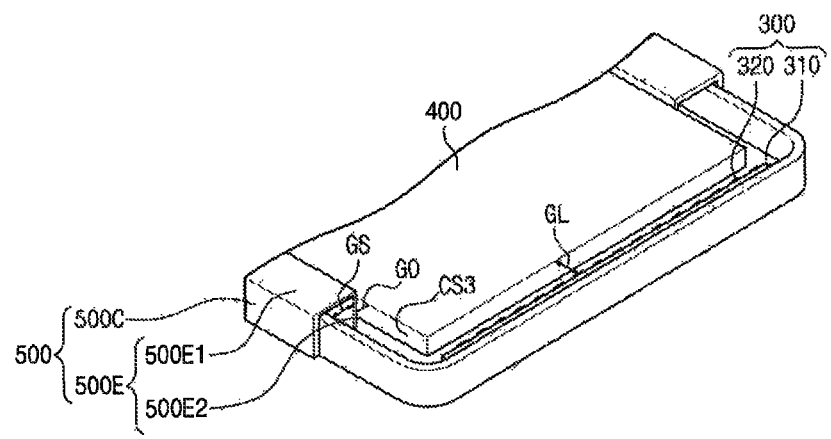
FIGS. 4A and 4B are perspective views showing the coupled state of the elements shown in FIG. 2.
Figure 4B:
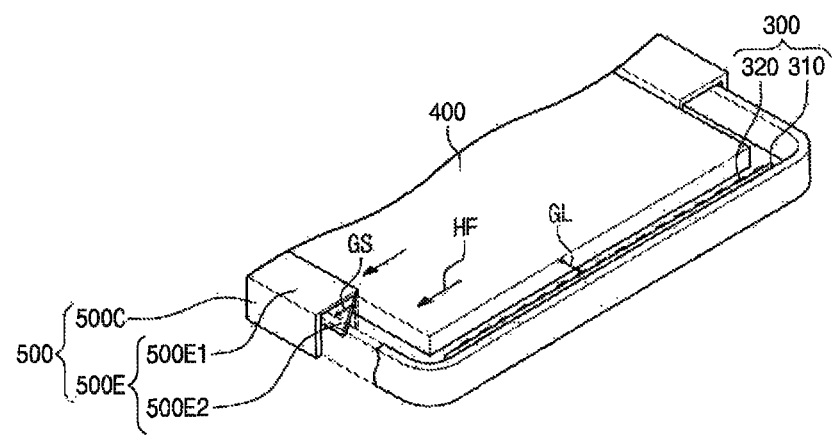
Figure 4C:
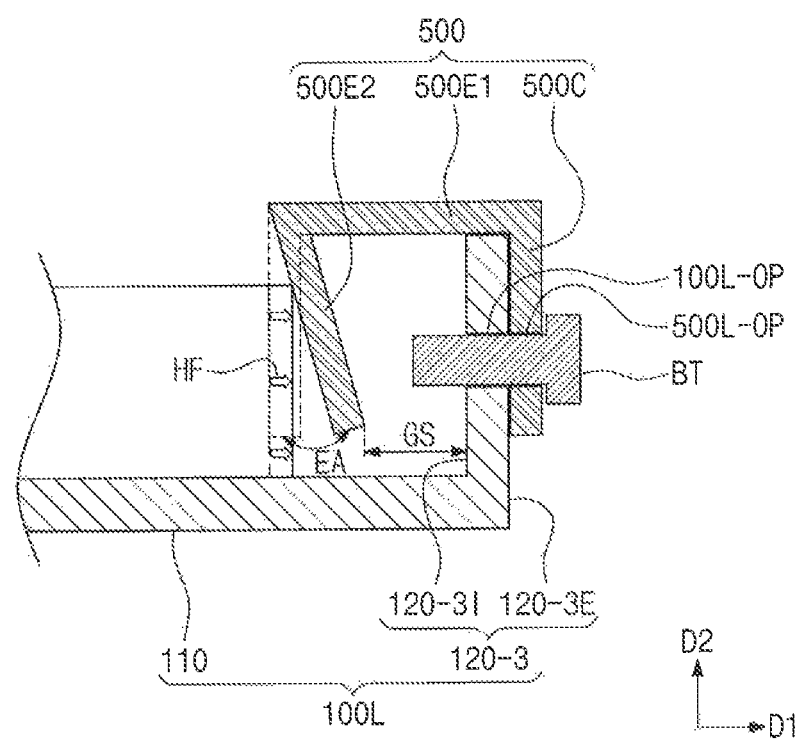
FIG. 4C is a cross-sectional view showing a portion of the elements shown in FIG. 4B.

FIGS. 4A and 4B are perspective views showing the coupled state of the elements shown in FIG. 2 and FIG. 4C is a cross-sectional view showing a portion of the elements shown in FIG. 4B. FIG. 4A shows the light guide member 400 that meets standard requirements and FIGS. 4B and 4C show the support member 500 deformed by pressure applied by the light guide member 400.

The term of "standard requirements" used herein means that the light guide member 400 has a size that coincides with a designed size, and the term of "greater than (>) the standard requirements" used herein means that the light guide member 400 has the size greater than the designed size. In FIGS. 4A and 4B, the same reference numerals may denote the same elements as in FIGS. 1 to 3B, and thus detailed descriptions of the same elements may be omitted.

According to an exemplary embodiment of the present inventive concept, the light guide member 400 may be spaced apart from the light source 300 by a predetermined distance GL. The distance GL may correspond to a distance between the light incident surface CS1 of the light guide member 400 and the light emitting blocks 320. The distance GL may allow the light guide member 400 to receive light emitted from the light source 300 without being damaged by the heat generated by the light source 300.

Referring to FIG. 4A, the second portion 500E2 of the decompressing part 500E may be spaced apart from the third sidewall portion 120-3 of the lower protective member 100L by a predetermined distance GS. The distance GS between the second portion 500E2 and the third sidewall portion 120-3 may be changed depending, for example, on the elasticity of the support member 500 and the size of the light guide member 400.

The second portion 500E2 may be in contact with the side surface of the light guide member 400. A gap G0 between the support member 500 and the light guide member 400 may be zero (0). The gap G0 between the support member 500 and the light guide member 400 may correspond to a minimum distance between the second portion 500E2 and the third side surface CS3 of the light guide member 400.

Referring to FIGS. 4B and 4C, the support member 500 may be deformed to correspond to the shape of the light guide member 400. The decompressing part 500E may be bent or deformed by a predetermined variation amount EA when the light guide member 400 has a size greater than the standard requirements. The decompressing part 500E may be closer to the third sidewall portion 120-3 by the variation amount EA.

The variation amount EA may be changed depending on the size of the light guide member 400 and the elasticity of the support member 500. The support member 500 may absorb the pressure from the light guide member 400 in accordance with the deformation of the decompressing part 500E.

The pressure applied to the support member 500 may be generated by various causes. For instance, when the size of the light guide member 400 is greater than the standard requirements, pressure may be applied to the support member 500 from the light guide member 400.

When the light guide member 400 is manufactured, an error of about 3 mm may occur in the size of the light guide member 400. Due to the error in the manufacturing process, it may be difficult to fit the light guide member 400 in the lower protective member 100L.

In the display device according to an exemplary embodiment of the present inventive concept, when the light guide member 400 having the size greater than the standard requirements is coupled to the support member 500, the second portion 500E2 may be bent toward the third sidewall portion 120-3. The support member 500 may stably accommodate the light guide member 400 with the size greater than the standard requirements therein since the decompressing part 500E2 having the elasticity is deformed.

Although the light guide member 400 having the size meeting the standard requirements may be coupled to the support member 500, the support member 500 may be applied with pressure from the light guide member 400, which may be thermally expanded. The light guide member 400 may be thermally expanded by the heat generated by the light source 300. Therefore, a thermal expansion phenomenon may occur on the light guide member 400, and thus the light guide member 400 may expand in a predetermined expansion direction HF.

The light guide member 400 may apply pressure to the support member 500 in the expansion direction HF. Accordingly, the decompressing part 500E of the support member 500 may be partially deformed by the pressure applied by the light guide member 400.

The distance GS between the second portion 500E2 and the third sidewall portion 120-3 may be reduced by the pressure applied by the light guide member 400. The second portion 500E2 may be deformed to be closer to the third sidewall portion 120-3 as the pressure applied to the second portion 500E2 by the light guide member 400 increases.

The support member 500 may effectively absorb the pressure from the light guide plate 400 since the second portion 500E2 may be deformed by the pressure from the light guide plate 400. Therefore, although the size of the light guide member 400 varies, the support member 500 may stably accommodate the light guide member 400 therein. Thus, the reliability of the display device may be increased.

Figure 5A:
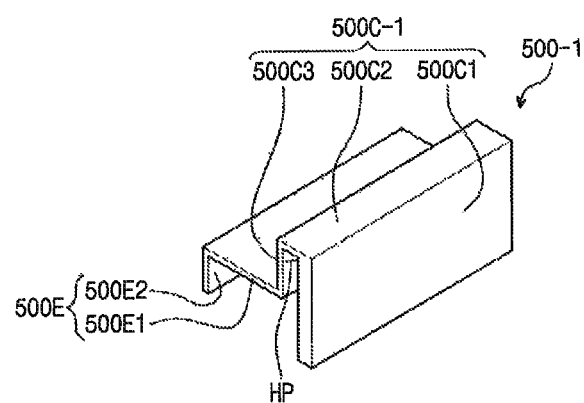
FIG. 5A is a perspective view showing a support member according to an exemplary embodiment of the present inventive concept.
Figure 5B:
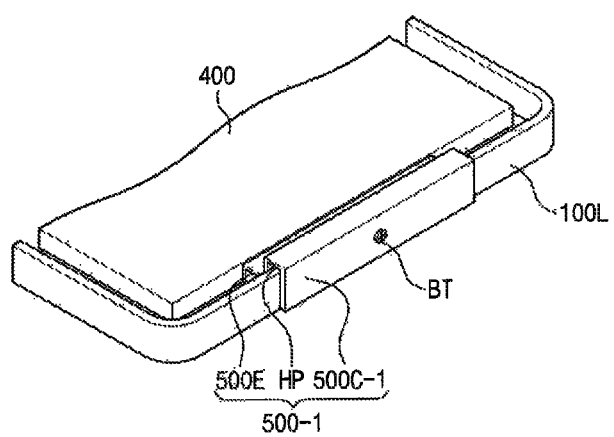
FIG. 5B is a perspective view showing a coupled state of the support member shown in FIG. 5A.

FIG. 5A is a perspective view showing a support member according to an exemplary embodiment of the present inventive concept and FIG. 5B is a perspective view showing a coupled state of the support member shown in FIG. 5A.

Referring to FIGS. 5A and 5B, a support member 500-1 may include a coupling part 500C-1 and a decompressing part 500E. The coupling part 500C-1 may include a first coupling portion 500C1, a second coupling portion 500C2, and a third coupling portion 500C3, which may be connected to each other. The first, second, and third coupling portions 500C1, 500C2, and 500C3 may form an insertion portion HP, e.g., a predetermined space.

At least a portion of the sidewall portion 120 may be disposed in the insertion portion HP. Due to the insertion portion HP, a coupling force of the coupling part 500C-1 may be decreased with respect to the sidewall portion 120. The first coupling portion 500C1 may cover a portion of the outer portion of the sidewall portion 120.

Although not shown in figures, a coupling member may be disposed between the first coupling portion 500C1 and the sidewall portion 120. The coupling member may include an adhesive material. The coupling force between the first coupling portion 500C1 and the sidewall portion 120 may be decreased by the coupling member.

Although not shown in figures, the first coupling portion 500C1 may include a through-hole formed therethrough. The coupling member may be disposed in the through-hole. The coupling member disposed in the through-hole may reduce the coupling force between the support member 500-1 and the sidewall portion 120.

The second coupling portion 500C2 may be bent in one direction from the first coupling portion 500C1. The second coupling portion 500C2 may be substantially parallel to the bottom portion 110. The second coupling portion 500C2 may cover a portion of the upper portion of the sidewall portion 120.

The third coupling portion 500C3 may be bent in one direction from the second coupling portion 500C2. The third coupling portion 500C3 may be substantially parallel to the sidewall portion 120. The third coupling portion 500C3 may cover the portion of the inner portion of the sidewall portion 120.

As described above, since the support member 500-1 includes the insertion portion HP defined therein, the support member 500-1 may be stably coupled to the lower protective member 100L. Although the light guide member 400 may be deformed, the support member 500-1 may stably support the light guide member 400.

Figure 6A:
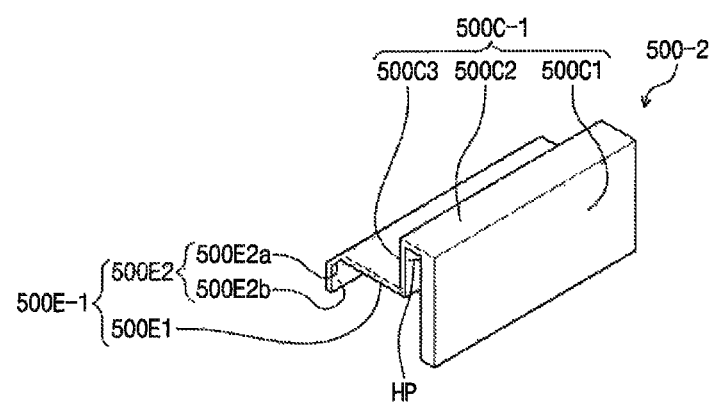
FIGS. 6A to 6C are perspective views showing support members according to exemplary embodiments of the present inventive concept.
Figure 6B:
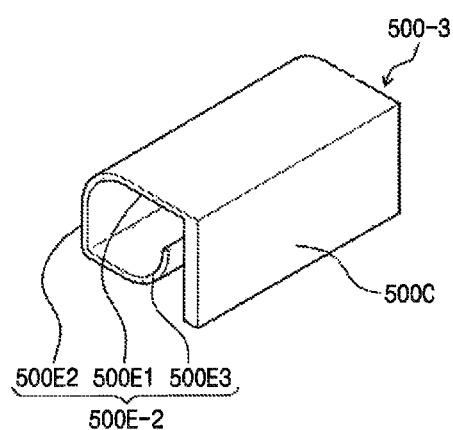
Figure 6C:
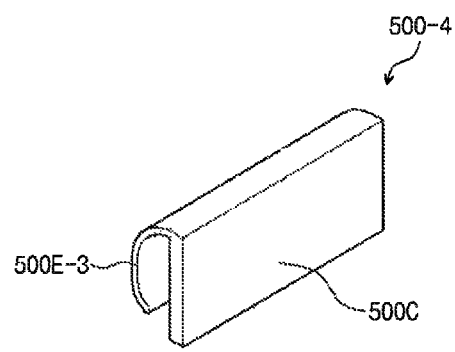

FIGS. 6A to 6C are perspective views showing support members according to exemplary embodiments of the present inventive concept. Various support members according to exemplary embodiments of the present inventive concept will be described in more detail with reference to FIGS. 6A to 6C. In FIGS. 6A to 6C, the same reference numerals may denote the same elements as in FIGS. 1 to 5B, and thus detailed descriptions of the same elements may be omitted.

Referring to FIG. 6A, the second portion 500E2 of a support member 500-2 may include an inclined portion 500E2a and a support portion 500E2b.

The inclined portion 500E2a may be connected to the first portion 500E1. The inclined portion 500E2a may be bent from the first portion 500E1 in a predetermined direction. The inclined portion 500E2a may be inclined at a predetermined angle with respect to the first portion 500E1.

The support portion 500E2b may be connected to the inclined portion 500E2a. The support portion 500E2b may be bent from the inclined portion 500E2a in a predetermined direction. The support portion 500E2b may be substantially parallel to the sidewall portion 120 (refer to, e.g., FIG. 5B) and may be inclined at a predetermined angle with respect to the inclined portion 500E2a.

The support portion 500E2b may be in contact with the side surface of the light guide member 400 (refer to, e.g., FIG. 5B). The support member 500-2 may be applied with pressure from the light guide member 400 through the support portion 500E2b.

The inclined portion 500E2a may allow the light guide member 400 (refer to e.g., FIG. 1) to be accommodated in the lower protective member 100L (refer to e.g., FIG. 1). Accordingly, although the space defined by the support member 500 coupled to the lower protective member 100L may be smaller than the light guide member 400, the light guide member 400 be in contact with the inclined portion 500E2a and may be accommodated in the spaced defined by the support portion 500E2b.

Referring to FIG. 6B, a support member 500-3 may include a bending portion 500E3. The bending portion 500E3 may be bent from the second portion 500E2 of the support member 500-3 toward the coupling part 500C.

The bending portion 500E3 may include at least one curved surface. The at least one curved surface may be defined by an edge of the bending portion 500E3 approaching the first portion 500E1.

The bending portion 500E3 may become closer to the coupling portion 500C while the second portion 500E2 absorbs pressure from the light guide member 400 and is bent. Accordingly, the display device may maintain the elasticity thereof and may reinforce the supporting force of the support member 500-3 that supports the light guide member 400.

Referring to FIG. 6C, a support member 500-4 may include a decompressing part 500E-3 that is integrally formed as a single unit. The decompressing part 500E-3 may be bent from the coupling part 500C.

The decompressing part 500E-3 may include a curved surface. At least a portion of the decompressing part 500E-3 may be in contact with the light guide member 400 and the curved surface may be spaced apart from the coupling part 500C by a distance. The distance may be defined as a distance which an edge of the decompressing part 500E-3 is apart from the coupling part 500C by. The support member 500-4 may absorb pressure from the light guide member 400 since the distance is reduced by the support member 500-4.

Figure 7:
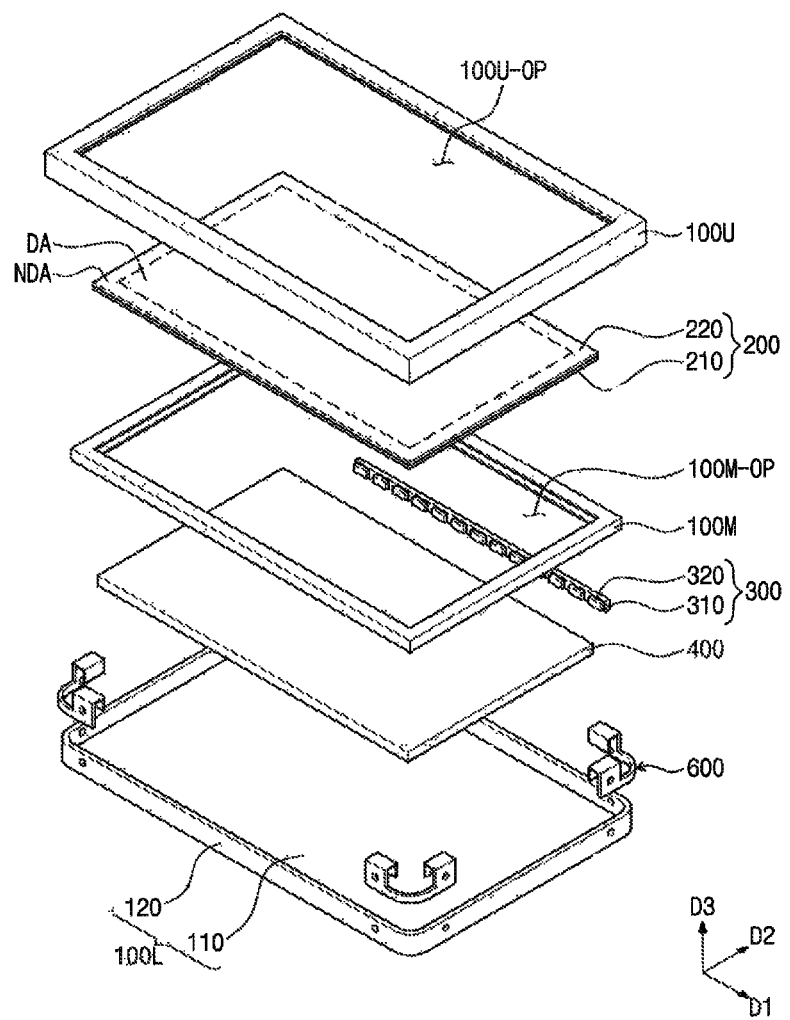
FIG. 7 is an exploded perspective view showing a display device according to an exemplary embodiment of the present inventive concept.
Figure 8A:
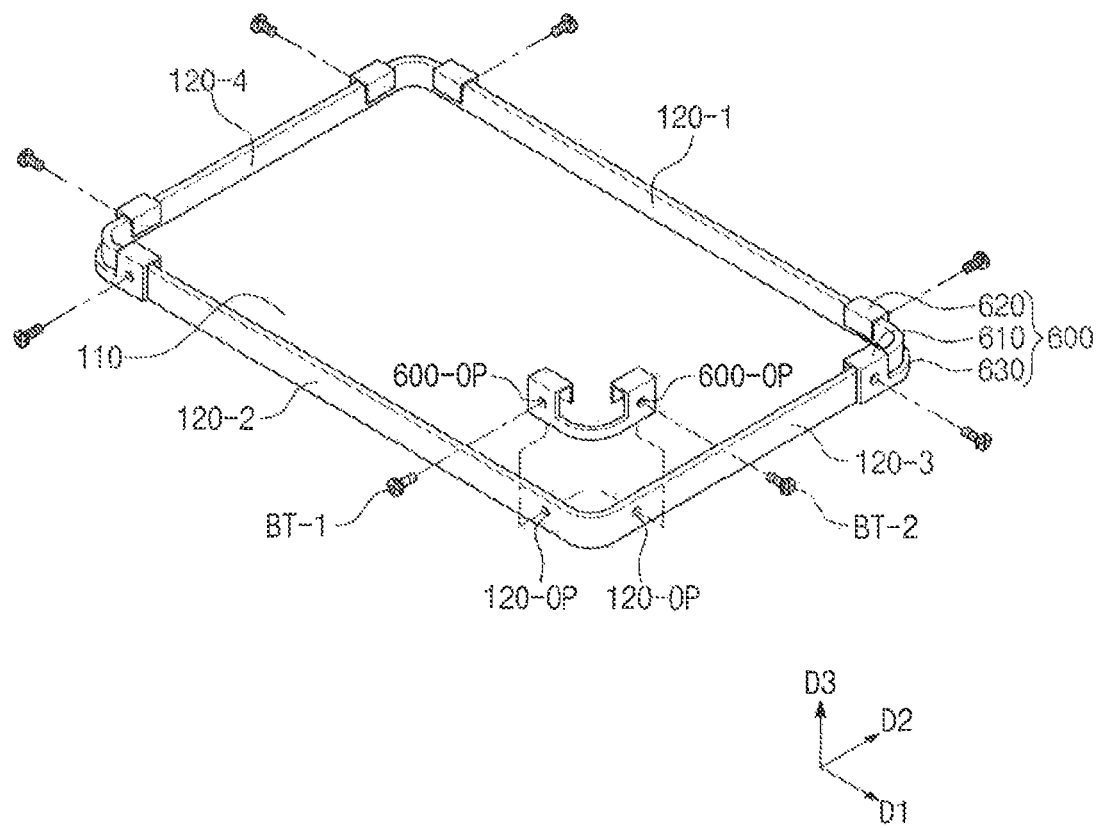
FIG. 8A is an exploded perspective view showing some elements of the display device shown in FIG. 7.
Figure 8B:
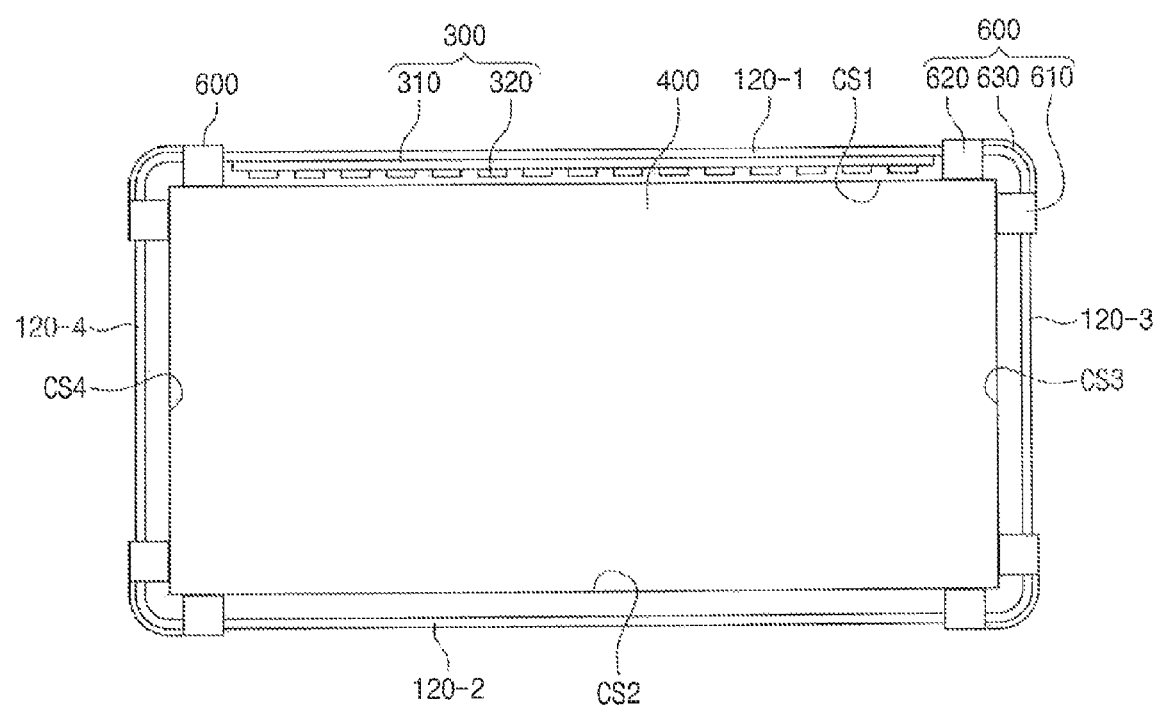
FIG. 8B is a plan view showing a coupled state of the elements shown in FIG. 8A.
Figure 8B:
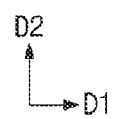
Figure 8C:
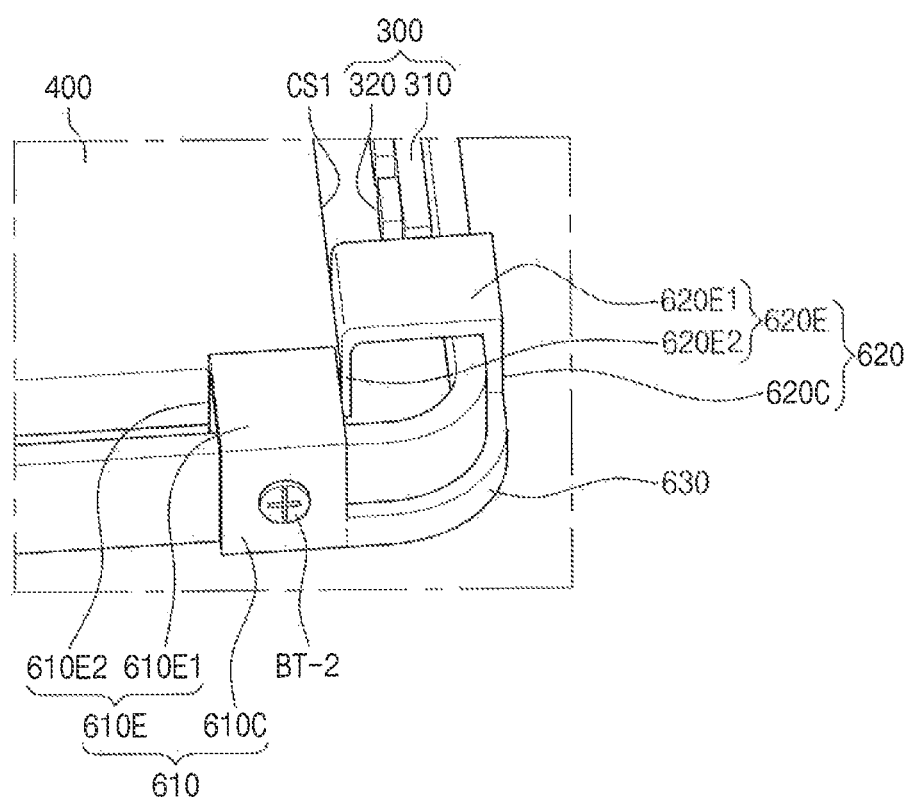
FIG. 8C is a partial perspective view showing a coupled state of the elements shown in FIG. 8A.

FIG. 7 is an exploded perspective view showing a display device according to an exemplary embodiment of the present inventive concept, FIG. 8A is an exploded perspective view showing some elements of the display device shown in FIG. 7, FIG. 8B is a plan view showing a coupled state of the elements shown in FIG. 8A, and FIG. 8C is a partial perspective view showing a coupled state of the elements shown in FIG. 8A.

The display device an exemplary embodiment of the present inventive concept may include at least one support member 600. According to an exemplary embodiment of the present inventive concept, the elements may have the same structure and function as those of the display device shown in FIG. 1 except for the support member 600. In FIGS. 7, and 8A to 8C, the same reference numerals may denote the same elements in FIGS. 1 to 6B, and thus detailed descriptions of the same elements may be omitted.

According to an exemplary embodiment of the present inventive concept, the display device may include a plurality of support members 600. The support members of the plurality of support members may have the same shape. Therefore, only one support member 600 will be described in more detail.

The support member 600 may include a first portion 610, a second portion 620, and a connection portion 630. The support member 600 may support two side surfaces of the light guide member 400 adjacent thereto.

The first portion 610 may be coupled to the first sidewall portion 120-1 to support the first side surface CS1 of the light guide member 400. The second portion 620 may be coupled to the third sidewall portion 120-3 adjacent to the first sidewall portion 120-1 to support the third side surface CS3 of the light guide member 400.

The third side surface CS3 may be disposed adjacent to the first side surface CS1. The support member 600 may receive pressure from the light guide member 400 through the two side surfaces CS1 and CS3. The support member 600 may absorb pressure from the light guide member 400 by the deformation of a decompressing part 610E of the first portion 610 and the decompressing part 620E2 of the second portion 620.

The connection portion 630 may connect the first portion 610 and the second portion 620. The connection portion 630 may connect a coupling portion of the first portion 610 and a coupling portion 620C of the second portion 620. As shown in FIG. 7 and 8A to 8C, the connection portion 630 may cover the outer portion of the sidewalls coupled to the support member 600.

Accordingly, the support member 600 may be stably coupled to the lower protective member 100L. The support member 600 may be configured to substantially fix the light guide member 400 to the lower protective member 100L such that the light guide member 400 does not move in the lower protective member 100L.

Each of the first and second portions 610 and 620 may have a shape corresponding to that of the support member 500 (see, e.g., FIG. 1). More detailed descriptions of the first and second portions 610 and 620 may be the same as described with reference to FIGS. 1 to 6B.

Figure 9A:
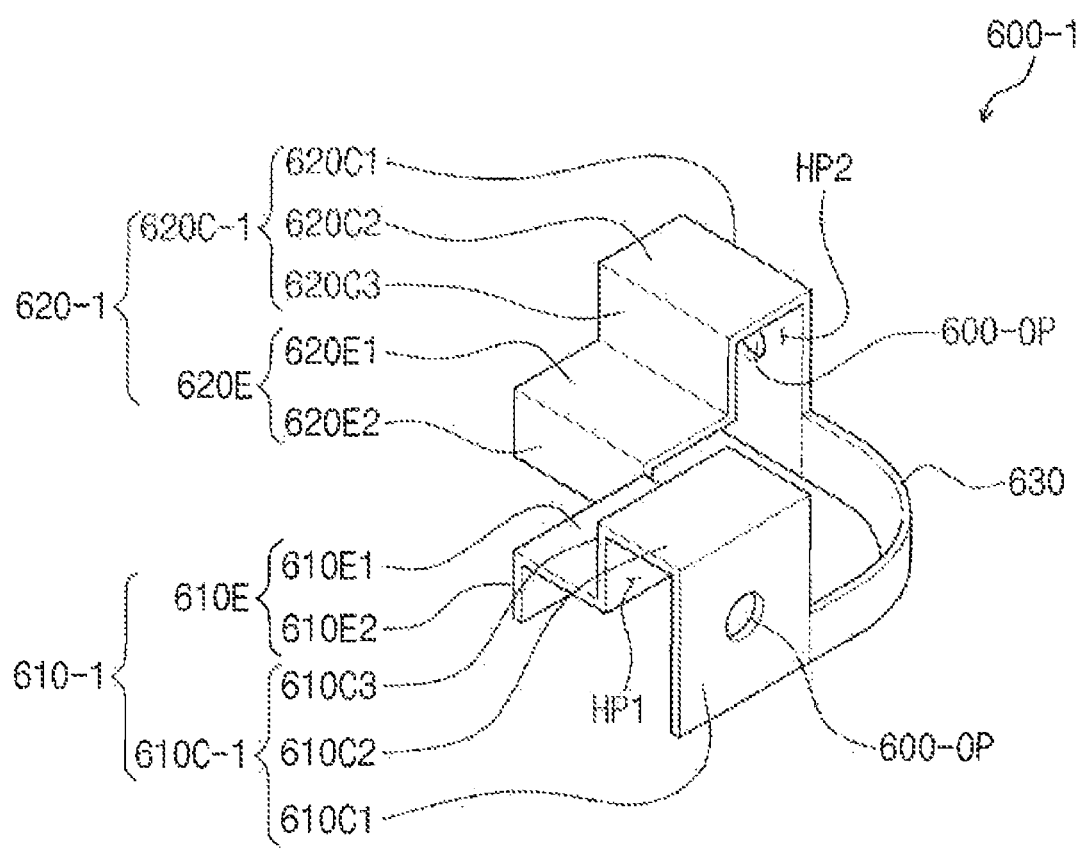
FIG. 9A is a perspective view showing a support member according to an exemplary embodiment of the present inventive concept.
Figure 9B:
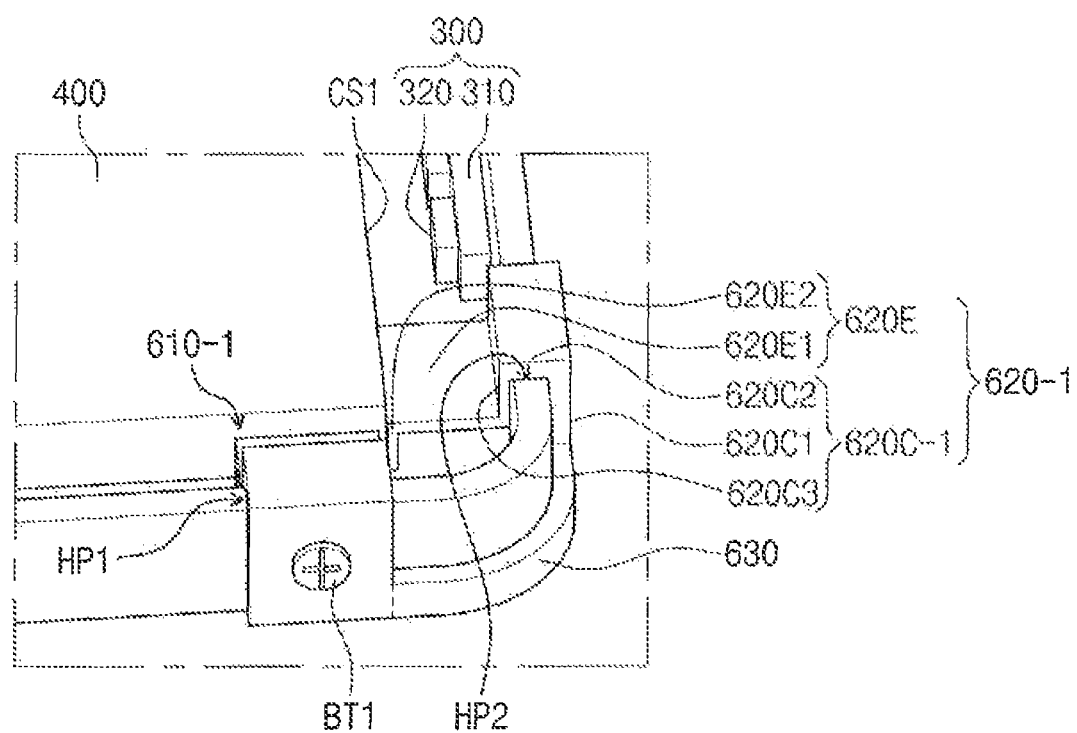
FIG. 9B is a partial perspective view showing a coupled state of the support member shown in FIG. 9A.

FIG. 9A is a perspective view showing a support member according to an exemplary embodiment of the present inventive concept and FIG. 9B is a partial perspective view showing a coupled state of the support member shown in FIG. 9A. In FIGS. 9A and 9B, the same reference numerals may denote the same elements as in FIGS. 7 and 8A to 8C, and thus detailed descriptions of the same elements may be omitted.

Referring to FIGS. 9A and 9B, a support member 600-1 may include a first portion 610-1, a second portion 620-1, and a connection portion 630 connecting the first and second portions 610-1 and 620-1. The first and second portions 610-1 and 620-1 may include insertion portions HP1 and HP2 respectively defined therein. The first and second portions 610-1 and 620-1 may have the same shape as that of the support member 500-1 shown in FIGS. 5A and 5B. Therefore, more detailed descriptions of the support member 600-1 may be omitted.

The insertion portions HP1 and HP2 may decrease the coupling force between the lower protective member 100L and the support member 600-1. Thus, the support member 600-1 may stably support the light guide member 400 even though the size of the light guide member 400 varies or is greater than the standard requirements.

Figure 10:
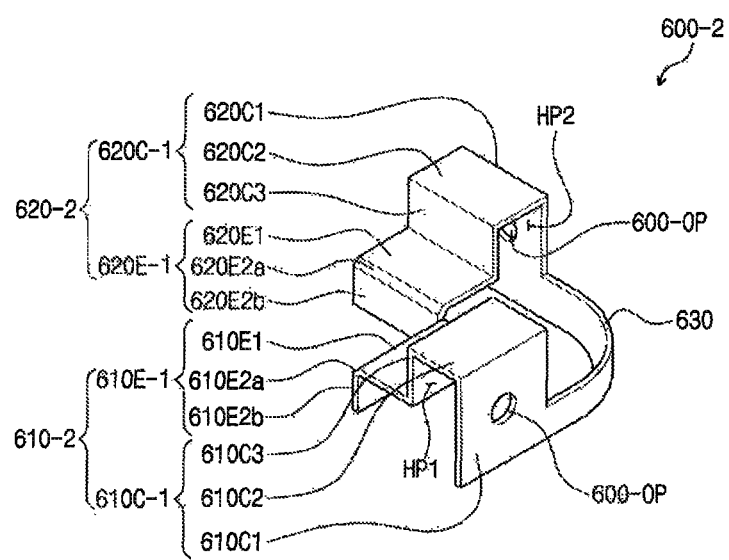
FIG. 10 is a perspective view showing a support member according to an exemplary embodiment of the present inventive concept.

FIG. 10 is a perspective view showing a support member according to an exemplary embodiment of the present inventive concept.

Referring to FIG. 10, a first portion 610-2 of a support member 600-2 may include a first coupling part 610C-1 in which an insertion portion HP1 is defined and a decompressing part 610E-1, which may include plural portions 610E2a and 610E2b. A second portion 620-2 of the support member 600-2 may include a second coupling part 620C-1 in Which an insertion portion HP2 is defined and a decompressing part 620E-1, which may include plural portions 620E2a and 620E2b.

The first and second portions 610-2 and 620-2 may have the same shape as that of the support member 500-2 shown in FIG. 6A. Accordingly, more detailed descriptions of the first and second portions 610-2 and 620-2 may be omitted.

Although not shown in figures, the first and second portions 610-2 and 620-2 may have the same shape as that of the support members 500-3 and 500-4 shown in FIGS. 6B and 6C.

While exemplary embodiments of the present inventive concept have been particularly shown and described with reference to the accompanying drawings, it will be understood by those of ordinary skill in the art that various changes in form and details may be made therein without departing from the spirit and scope of the present inventive concept.

What is claimed is:

1. A display device comprising:
a display panel;
a light source configured to emit light;
a light guide member configured to receive the light and guide the light toward the display panel;
a protective member that accommodates the light guide member, wherein the protective member includes a bottom portion and a plurality of sidewall portions bent upward from the bottom portion; and
a support member configured to absorb pressure from the light guide member, the support member comprising:
a coupling part coupled to a sidewall portion of the plurality of sidewall portions; and
a decompressing part connected to the coupling part, the decompressing part comprising a bent portion spaced apart from the coupling part in a direction which vertical to the sidewall portion,
wherein a distance between the bent portion and the coupling part is configured to change in response to a force applied by the light guide member,
wherein the coupling part comprises:
a first coupling portion disposed on an outer surface of the sidewall portion;
a second coupling portion bent from the first coupling portion in a predetermined direction and substantially parallel to the bottom portion; and
a third coupling portion bent from the second coupling portion, wherein the third coupling portion is substantially parallel to the first coupling portion, wherein the third coupling potion is disposed on an inner surface of the sidewall portion, and wherein the sidewall portion is partially disposed in a space defined by the first, second, and third coupling portions.

2. A display device comprising:
a display panel;
a light source configured to emit light;

a light guide member configured to receive the light and guide the light toward the display panel;

a protective member that accommodates the light guide member, wherein the protective member includes a bottom portion and a plurality of sidewall portions bent upward from the bottom portion; and a support member configured to absorb pressure from the light guide member, the support member comprising:

a coupling part coupled to a sidewall portion of the plurality of sidewall portions;

a decompressing part connected to the coupling part, the decompressing part comprising a bent portion spaced apart from the coupling part in a direction which vertical to the sidewall portion; and a plurality of decompressing parts and a plurality of coupling parts, wherein the coupling parts are respectively coupled to two sidewall portions adjacent to each other, and wherein the decompressing parts are respectively coupled to the coupling parts, wherein a distance between the bent portion and the coupling part is configured to change in response to a force applied by the light guide member.

3. The display device of claim 2, wherein the decompressing parts are respectively in contact with side surfaces of the light guide member, and wherein the side surfaces respectively face the sidewall portions coupled to the coupling parts.

4. The display device of claim 3, wherein the support member further comprises a connection portion connecting the coupling parts, and wherein the support member covers the adjacent sidewall portions.

5. A display device comprising:

a display panel;

a light source configured to emit light;

a light guide member configured to receive the light and guide the light toward the display panel;

a protective member that accommodates the light guide member, wherein the protective member includes a bottom portion and a plurality of sidewall portions bent upward from the bottom portion; and a support member configured to absorb pressure from the light guide member, the support member comprising:

a coupling part coupled to a sidewall portion of the plurality of sidewall portions; and a decompressing part connected to the coupling part, the decompressing part comprising a bent portion spaced apart from the coupling part in a direction vertical to the sidewall portion, wherein a distance between the bent portion and the coupling part is configured to change in response to a force applied by the light guide member, and wherein the coupling part comprises:

a first coupling portion disposed on an outer surface of a sidewall portion coupled thereto;

a second coupling portion bent from the first coupling portion in a predetermined direction and substantially parallel to the bottom portion; and a third coupling portion bent from the second coupling portion, wherein the third coupling portion is substantially parallel to the first coupling portion, wherein the third coupling portion is disposed on an inner surface of the sidewall portion, and wherein the coupled sidewall portion is partially disposed in a space defined by the first, second, and third coupling portions.

6. The display device of claim 5, wherein the bent portion comprises at least one curved surface.

7. The display device of claim 5, wherein the coupling part is disposed on an inner surface or an outer surface of the sidewall portion.

8. The display device of claim 7, wherein the decompressing part comprises:

a first portion coupled to the coupling part and bent from the coupling part in a first predetermined direction;

a second portion connected to the first portion and bent from the first portion in a second predetermined direction.

9. The display device of claim 8, wherein the second portion is in contact with a side surface of the light guide member.

10. The display device of claim 9, wherein the first portion is substantially parallel to the bottom portion and the second portion is substantially parallel to the sidewall portion.

11. The display device of claim 10, wherein the second portion comprises:

an inclined portion connected to the first portion and bent from the first portion at a first angle; and a support portion in contact with the light guide member and bent from the inclined portion at a second angle, wherein the support portion is substantially parallel to the sidewall portion.

12. The display device of claim 9, wherein the decompressing part further comprises a third portion bent from the second portion toward the coupling portion, wherein the third portion comprises at least one curved surface.

13. The display device of claim 5, further comprising a coupling member coupling the support member and the protective member.

14. The display device of claim 13, wherein the coupling member comprises an adhesive.

15. The display device of claim 13, wherein the sidewall portion comprises a first through-hole formed therethrough, the coupling part comprises a second through-hole overlapping the first through-hole, and wherein the coupling member is disposed in the first and second through-holes to couple the support member and the protective member.

16. The display device of claim 14, further comprising a plurality of support members, wherein the support members respectively support side surfaces of the light guide member.

17. The display device of claim 5, wherein the support member comprises stainless steel.

18. The display device of claim 5, wherein the decompression part comprises:

a first portion coupled to the coupling part, wherein the first portion is bent from the coupling part;

a second portion coupled to the first portion, wherein the second portion is bent from the first portion, wherein the second portion is configured to make contact with a side surface of the light guide member, and wherein the second portion is configured to be deformed toward to the coupling part.

19. The display device of claim 18, wherein the second portion is configured to be deformed toward the coupling part by a variation amount, and wherein the variation amount is determined according to a size of the light guide member.

* * * * *